Patented June 5, 1945

2,377,626

UNITED STATES PATENT OFFICE 2,377,626

PEST CONTROL

Hubert G. Guy, Mount Lebanon Township, Allegheny County, Pa., assignor to E. I. du Pont de Nemours & Company, Wilmington, Del., a corporation of Delaware No Drawing. Application January 8, 1943, Serial No. 471,735

8 Claims. (Cl. 167—14)

This invention relates to the control of nematodes or eelworms which infest soil and attack subterranean parts of plants.

Nematodes, or eelworms, are tiny round worms which infest soil and attack the subterranean parts of a variety of plants. Certain species, such as the root-knot nematode (Heterodera marioni), cause serious damage to plants in greenhouses thruout the United States and in farming in the more temperate regions.

I have now found that control of nematodes can be effected by treating the infected soil to incorporate therein ammonium sulfamate or other water-soluble salt of sulfamic acid. I am able by incorporating relatively small amounts of these agents in the soil adequately to control the disease with great economy and little danger of injury to seedlings. By incorporating these agents into infested soil in suitable quantities plants may be set out after a suitable period of weathering, which appears to be variable according to the character of the soil, without injury and, in fact, after a suitable period of weathering the agents appear actually to become phytonutrient rather than phytocidal.

The active agents of the invention may be applied to the soil from aqueous solution. Thus, one pound more or less of ammonium sulfamate up to the limits of its solubility of water may be dissolved per gallon of water and the resulting solutions broadcast, as, for example, by a suitable sprinkler over the infected area. It may be then worked into the soil to the desired depth of four to six inches by suitable equipment and has the advantage because of its water solubility that uniform distribution in the soil is not as critical as with the case of water-insoluble materials.

In lieu of water as a diluent there may be used a finely divided solid such as sand or dry soil, or talc, celite, kaolin, fuller's earth, pyrophyllite, diatomaceous earth, kieselguhr, hydrated lime, chalk, and gypsum or industrial fertilizers, such as mixed phosphates and potassium and nitrogen fertilizers. These dry compositions containing between about 20 and about 95% active ingredient, suitably 50%, may be broadcast in suitable broadcast apparatus and worked into the soil by plowing or harrowing or like methods.

The material is incorporated in the soil in concentrations varying according to the particular circumstances, according to the extent of the infestation, according to the particular kind of nematode and according to the manner of cultivation and application. When strewn broadcast and cultivated in the soil the amount may vary according to the depth of cultivation. For the effective control of nematodes the first four to six inches of soil is most important. If cultivation is only to this depth, as little as 400 pounds of the compound per acre (200 parts per million) may be sufficient to effect satisfactory control. Ordinarily it will not be necessary to use more than about 600 to 800 pounds per acre (300 to 400 parts per million). Ammonium sulfamate applied at a concentration of 200 parts per million has been observed to effect satisfactory control. With deeper cultivation more may be required and with special types of planting economy may be effected by limiting applications to the immediate vicinity of the proposed planting as, for example, in rows or hills.

The treatment is made sufficiently in advance of planting to permit the treated soil to weather. In some cases as little as four weeks will be found satisfactory whereas in others (acid soils) a much longer time may be required. It will be satisfactory if the treatment is effected in the fall for spring planting. When the soil is properly weathered planting may be done without detriment to germination to the seed or to the growth of seedlings and, as previously suggested, weathering tends to break the salts down and thus make their nitrogen content available for nutriment. Weathering not only hastens leaching of the salts or their conversion to a harmless state but also keeps the nematodes in condition most susceptible to control. It may be effected naturally or artificially. If the soil is allowed to become too dry the nematodes have a tendency to encyst so that where facilities are available it is best to keep the soil moist in order to insure adequate disinfection.

I claim:

1. The method of conditioning soil infected with nematodes which comprises incorporating in the soil a water-soluble salt of sulfamic acid in an amount sufficient to devitalize the nematodes.

2. The method of conditioning soil infected with nematodes whereby plants may be grown therein without deleterious attack which comprises incorporating in the soil a water-soluble salt of sulfamic acid in a concentration sufficient to devitalize the nematodes and exposing the treated soil to weathering prior to planting.

3. The method of conditioning soil infected with nematodes which comprises incorporating in the soil ammonium sulfamate in an amount sufficient to devitalize the nematodes.

4. The method of conditioning soil infected with nematodes whereby plants may be grown therein without deleterious attack which comprises incorporating in the soil ammonium sulfamate in a concentration sufficient to devitalize the nematodes and exposing the treated soil to weathering prior to planting.

5. The method of conditioning soil infected with nematodes which comprises incorporating in the soil a water-soluble salt of sulfamic acid in the proportions of about 200 to about 400 parts per million of soil.

6. The method of conditioning soil infected with nematodes which comprises incorporating in the soil ammonium sulfamate in the proportions of about 200 to about 400 parts per million of soil.

7. The method of conditioning soil infected with nematodes whereby plants may be grown therein without deleterious attack which comprises incorporating in the soil a water-soluble salt of sulfamic acid in a concentration of about 200 to about 400 parts per million and exposing the treated soil to weathering sufficient to render the treated soil non-phytocidal prior to planting.

8. The method of conditioning soil infected nematodes whereby plants may be grown therein without deleterious attack which comprises incorporating in the soil ammonium sulfamate in a concentration of about 200 to about 400 parts per million and exposing the treated soil to weathering sufficient to render the treated soil non-phytocidal prior to planting.

HUBERT G. GUY.